United States Patent [19]

Bereza

[11] Patent Number: 5,001,456

[45] Date of Patent: Mar. 19, 1991

[54] TIME AND DISTANCE MEASUREMENT APPARATUS

[76] Inventor: Thomas G. Bereza, 5055 Pleasant Creek, Comstock Park, Mich. 49321

[21] Appl. No.: 450,418

[22] Filed: Dec. 14, 1989

[51] Int. Cl.⁵ .............................................. G08B 1/08
[52] U.S. Cl. ............................... 340/425.5; 116/28 R; 116/211
[58] Field of Search ................ 116/32, 35 R, 36, 37, 116/38, 56, 57, 211, 203, DIG. 43, 28 R; 221/15, 16; 137/552.7, 555; 340/425.5, 436

[56] References Cited

U.S. PATENT DOCUMENTS

| | | | |
|---|---|---|---|
| 2,474,537 | 6/1949 | MacLeod | 116/211 X |
| 3,263,644 | 8/1966 | Irby | 116/32 |
| 3,490,409 | 1/1970 | Pomeroy | 340/436 X |
| 3,768,436 | 10/1973 | Martini | 116/211 |

Primary Examiner—William A. Cuchlinski, Jr.
Assistant Examiner—James K. Folker
Attorney, Agent, or Firm—Varnum, Riddering, Schmidt & Howlett

[57] ABSTRACT

An apparatus is provided to facilitate the accurate measurement of changes in velocity of a vehicle. The apparatus (10) comprises a firing box (14) and a remote control box (16) for controlling a sequence of operations. A plurality of individually actuated solenoids (46) mounted within the firing box (14) actuate the firing of a plurality of marker cartridges (104) from a magazine (94) mounted to the firing box (14). The firing box (14) is mounted to the exterior of a vehicle (12). When a brake sensor (144) signals the actuation of a brake in the vehicle, the signal actuates the sequential firing of the cartridges (104) in equally spaced time increments to leave indicia on the surface of the ground over which the vehicle moves.

20 Claims, 7 Drawing Sheets

TIME AND DISTANCE MEASUREMENT APPARATUS

BACKGROUND OF THE INVENTION

1. Field of the Invention

This invention relates to a time-and-distance measurement apparatus and, more particularly, to an instrument which facilitates calculation of the acceleration or deceleration of a motor vehicle involved in a collision.

2. Description of the Related Art

In the science of vehicular accident reconstruction, investigators, scientists, engineers and forensic specialists attempt to recreate, after the fact, the sequence of events immediately preceding an accident to determine the contributing factors to the accident. It is often critically important for the investigator to assess variables such as the effect of the weather on the accident and of pavement conditions, the braking efficiency of the vehicles in question, the acceleration and deceleration of the vehicles involved in the accident, and the performance of the operator of the vehicle in response to the conditions prevailing at the time of the accident.

Influences such as the weather and the condition of the pavement can dramatically affect acceleration, deceleration and braking efficiency of a vehicle. It is important for the investigator to be able to determine these variables as accurately as possible in order to arrive at an informed opinion as to the principal cause of the accident. The accident causation analysis is greatly facilitated if time, distance, velocity, and acceleration calculations can be made directly at the scene of the accident since, in many cases, the ambient conditions immediately subsequent to the accident will be relatively consistent with the conditions immediately prior to and during the accident. However, investigative technology has heretofore consisted of attempts to reconstruct the accident at a time considerably later than the occurrence of the accident. Obviously, it is quite difficult to accurately recreate the ambient conditions prevailing at the time of the accident. Although computer modeling techniques are frequently employed and in recent years have become quite sophisticated, they nevertheless require an estimation of the aforementioned variables.

Thus, there has been a need for an apparatus that facilitates the calculation of acceleration, deceleration, braking efficiency, and like parameters of a motor vehicle involved in an accident immediately following the accident and before the prevailing conditions have changed substantially. Such calculations help to identify mechanical, electrical or hydraulic defects in one or more vehicles involved in an accident, human error in the operation of the vehicles, and thus ultimately the entities liable for costs and losses associated with the accident.

SUMMARY OF THE INVENTION

In accordance with the invention, in apparatus is provided for facilitating the accurate calculation of changes in velocity of a vehicle by which other parameters may be calculated in reconstructing an accident. More specifically, the invention provides an apparatus for marking a surface in a manner to indicate changes in velocity of a vehicle moving over the surface. The apparatus comprises a plurality of markers and a support means for supporting the plurality of markers on the vehicle. Also included is a firing means for propelling the markers toward the surface with sufficient force to cause each marker to strike and remain on the surface at its point of contact when the marker is so projected. Further, the apparatus the markers are sequentially propelled in equally spaced, timed increments.

In one aspect of the invention, the timing means actuates the firing means in response to a signal indicating a change in the velocity of the vehicle. Preferably, the signal is generated by a sensor. This sensor can be a brake sensor which indicates when the brake on the vehicle is actuated. This sensor can also be a momentum sensor which indicates that the vehicle is being accelerated (or decelerated).

Preferably, the firing means comprises a plurality of solenoids, each solenoid being disposed in juxtaposition to a single respective marker. Typically, each marker comprises a cartridge including a dye compound and an explosive charge positioned to be fired by the respective solenoid. The cartridges are disposed in a magazine which is removably secured to the support means. The support means may comprise a housing with the firing means being mounted within the housing. Alternatively, the firing means can be mounted directly to the support means.

In another aspect of the invention, the apparatus further includes a control means for actuating the timing means. Preferably, the control means comprises a start-switch which actuates the firing means to project a single marker prior to actuation of the timing means. The control means may also include a sensor which actuates the timing means when the sensor detects a change in velocity of the vehicle.

In a typical embodiment of the invention, the control means is remote from the firing means. Preferably, the timing means actuates the firing means every 0.25 seconds until all of the markers are projected. Optionally, each marker may be of a different color.

BRIEF DESCRIPTION OF THE DRAWINGS

The invention will now be described with reference to the drawings in which.

DETAILED DESCRIPTION OF THE PREFERRED EMBODIMENTS

Figure 1:
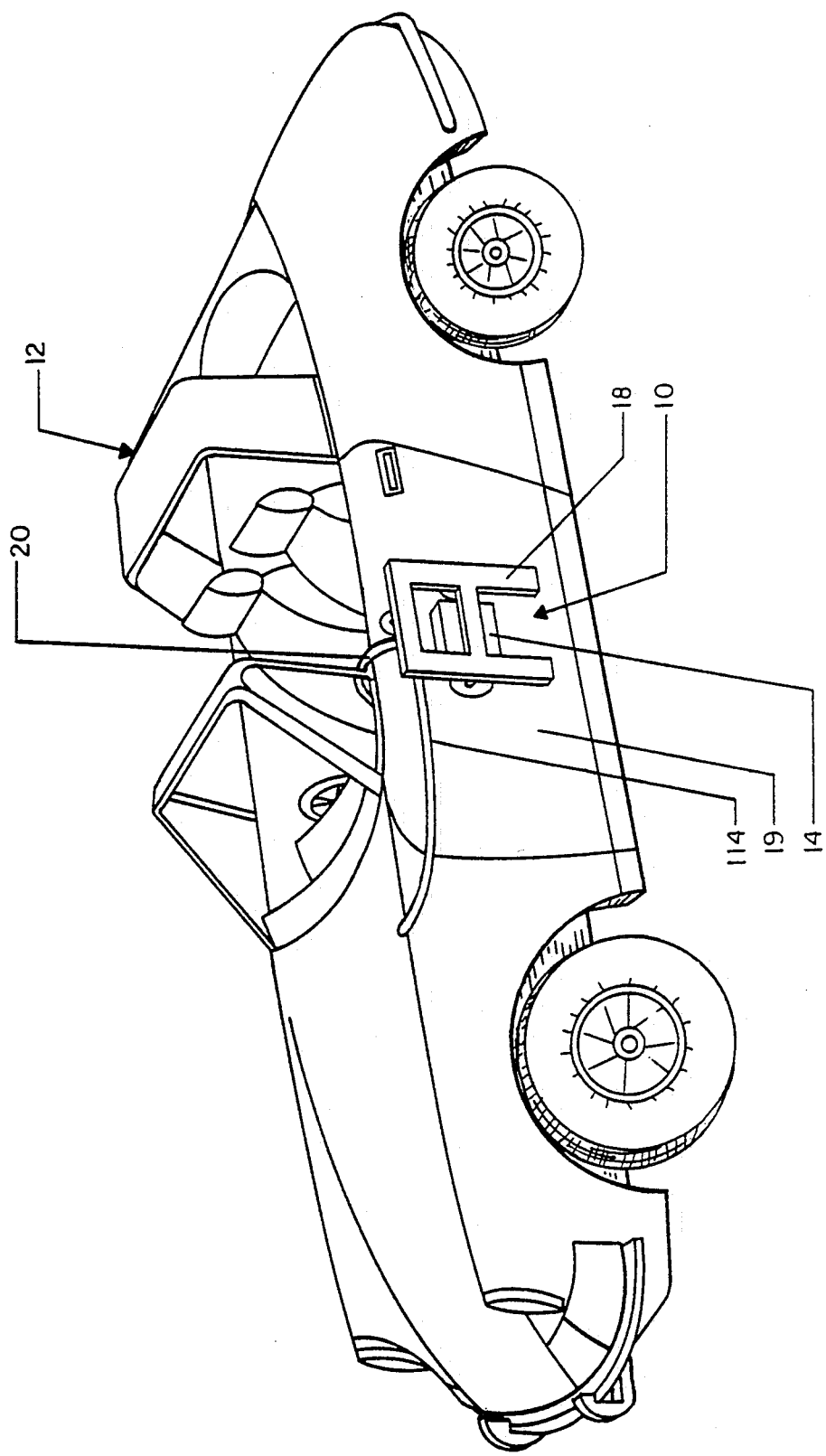
FIG. 1 is a perspective view of a time-and-distance measurement apparatus according to the invention and shown in conjunction with a motor vehicle to which it is secured.
Figure 2:
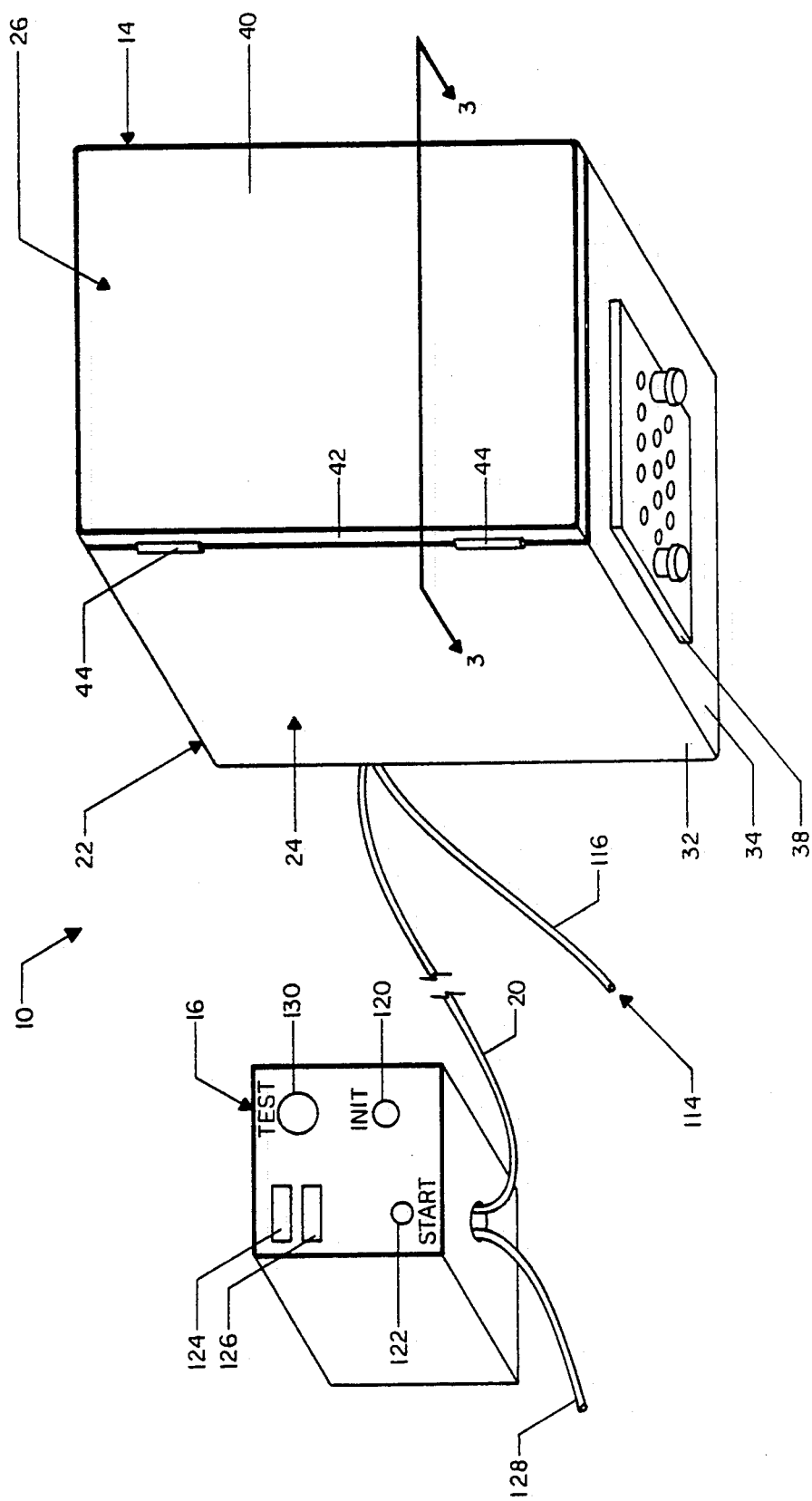
FIG. 2 is an enlarged perspective view of the firing box and control box portions of the time and distance measurement apparatus of FIG. 1.
Figure 3:
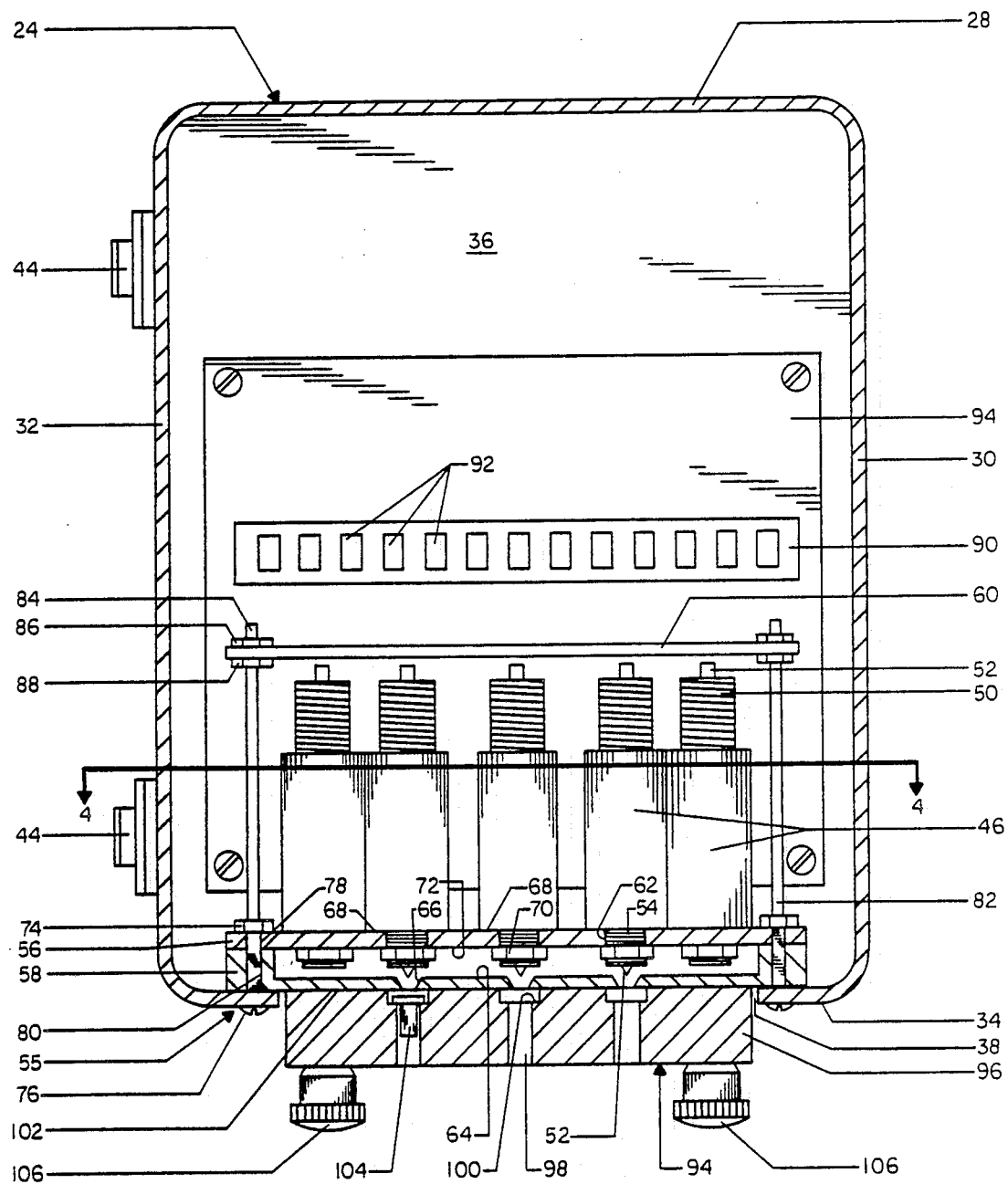
FIG. 3 is a sectional view taken along lines 3—3 of FIG. 2.

Turning now to the drawings, and in particular FIGS. 1 and 2, the time and distance measurement apparatus embodying the present invention is designated generally by the reference numeral 10 and is shown in conjunction with a motor vehicle 12. The instrument 10 comprises a firing box 14 and a hand-held, remote-control box 16. A mounting bracket 18 provides means for mounting the apparatus 10 to a door 19 of the motor vehicle 12.

The apparatus 10 facilitates the collection of accurate data pertinent to the reconstruction of an accident by placing markers on the surface of the ground while the vehicle 12 is in motion. Further, the markers are placed sequentially in precise preselected time increments. Simultaneously, the instrument records the elapsed time to verify the accuracy of the data. Thus, with the known distance between markers, and the known time between placement of markers, important parameters such as changes in velocity of the vehicle and the braking efficiency can be accurately calculated.

Turning now to FIGS. 2 through 5, the firing box 14 and the remote-control box 16 are electrically connected by a conduit 20. The control box 16 is adapted to be mounted or carried in the vehicle within reach of the driver in any suitable manner; for example, it may be hand held, fixedly mounted to the interior of the vehicle or resting loosely o the seat next to the driver. The firing box 14 is mounted to the exterior of the vehicle on the mounting bracket 18.

The firing box 14 includes an outer casing 22 that comprises a main housing 24 and a cover 26. The main housing 24 includes a top wall 28, a pair of sidewalls 30 and 32, a bottom wall 34, and a rear wall 36. The bottom wall 34 is formed with an opening 38. The cover 26 includes a front face 40 and an integral upstanding marginal flange 42 and is mounted for rotation relative to the housing 24 by means of hinges 44 that are secured to the marginal flange 42 and the sidewall 32, although the cover could alternatively be hinged to the opposing sidewall 30. Although not specifically shown in the drawings, the casing 22 may further include means for latching the cover 26 to the housing 24, thereby retaining it in a closed position. It will be readily apparent that the cover 26 permits access to the interior of the casing 22.

Figure 4:
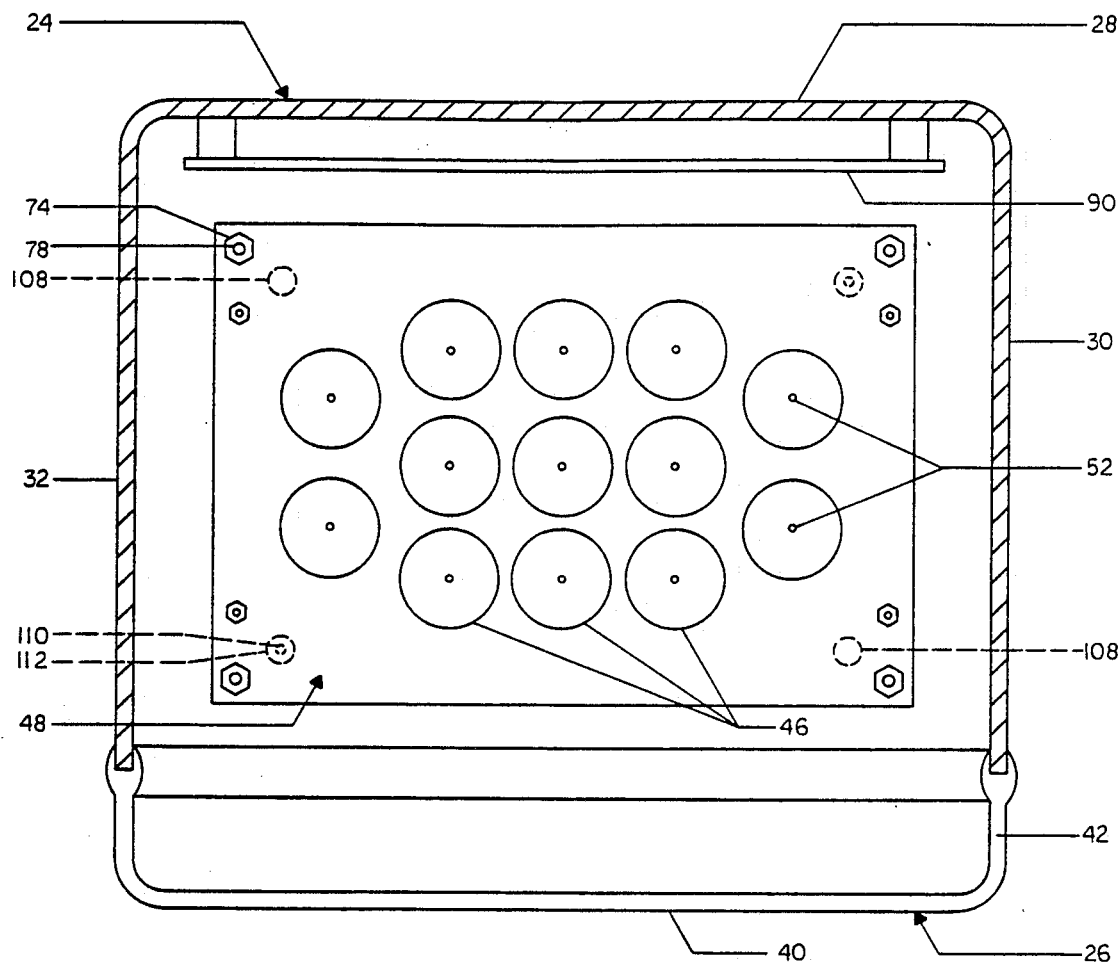
FIG. 4 is a sectional view taken along lines 4—4 of FIG. 3.
Figure 5:
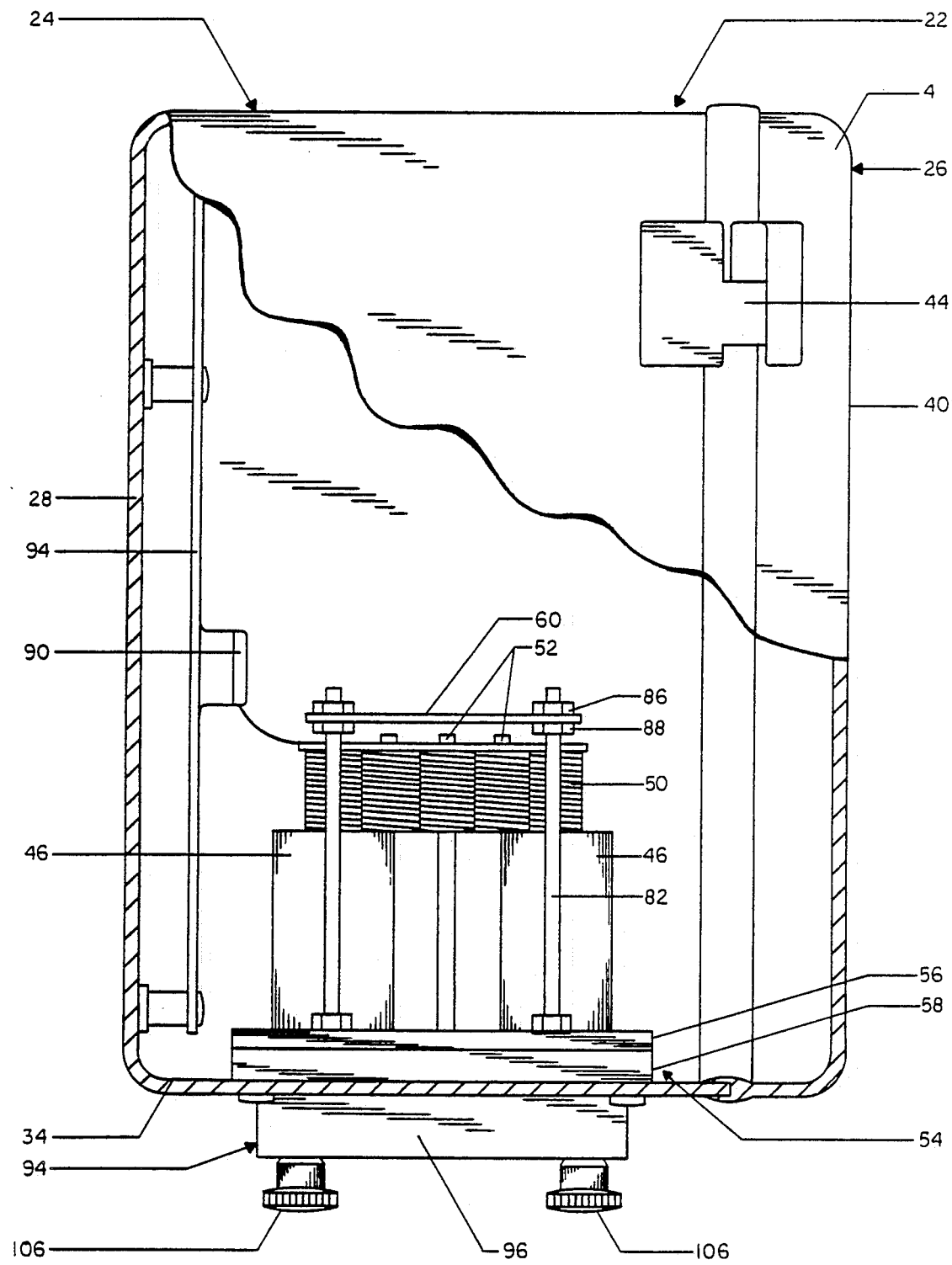
FIG. 5 is a side elevational view of the firing box of FIG. 2, partly in section.

Arranged in the interior of the casing 22 are a plurality of solenoids 46. In the preferred embodiment, thirteen solenoids 46 are arrayed in a cluster 48 as shown in FIG. 4. The exact geometrical pattern of the cluster is not critical to the invention, nor is the number of solenoids. Each solenoid 46 comprises a solenoid coil 50, a plunger 52 adapted for reciprocating movement along the longitudinal axis (not shown separately in the drawings) of the solenoid, and a threaded mounting lug 54 at a lower end of the solenoid. The solenoid coil 50 preferably draws a current of approximately fifteen amperes to provide sufficient force to the plunger 52 to ignite the explosive charge in the cartridge. The cluster 48 is disposed adjacent the opening 38 so that the plunger 52 of each solenoid 46 is adapted to reciprocate through the opening 38. The solenoids 46 are secured within the interior of the casing 22 by way of solenoid mounting means 55.

The mounting means 55 comprises a first solenoid mounting plate 56, a second or intermediate solenoid mounting plate 58, and a solenoid retainer 60. The second solenoid mounting plate 58 is dimensioned to be slightly larger than the opening 38 in the bottom wall 34 of the housing 24 and is positioned against the bottom wall in a substantially overlying relationship relative to the opening.

The first solenoid mounting plate 56 is provided with a plurality of through-holes 62 arrayed identically to the array of solenoid cluster 48 and adapted to be in registry therewith when the solenoids are mounted to the plate 58. Each hole 62 is large enough to receive the mounting lug 54 of one of the solenoids 46 in the cluster 48. The second solenoid mounting plate 58 is provided with a recessed area 64 in which a plurality of plunger-receiving apertures 66 are arrayed identically to the array of the solenoid cluster, each aperture extending entirely through the second solenoid mounting plate 58.

In assembly, the plate 56 is placed in an overlying relationship with the plate 58 with the latter bearing against the bottom wall 34 of the housing 24, and the recessed are disposed between the plates 56, 58. The plates 56, 58 may be secured to the housing by any suitable means, as by the nuts and bolts illustrated in FIGS. 3 to 5 and described with greater particularity hereinbelow. Each plunger-receiving aperture 66 is aligned with the center of each through-hole 62. The solenoids 46 are mounted to the plates 56, 58 by way of the threaded mounting lugs 54 that are received in the through-holes 62 and extend into the recessed area 64. Preferably, the recessed area is adequately dimensioned in area and depth to accommodate the entire array of mounting lugs 54 so that a lower end 68 of each solenoid 46 bears against an upper surface of the first solenoid mounting plate 56. Threaded collars 70 are threadably engaged with the threaded mounting lugs 54 and adjusted to bear against a lower surface 72 of the first solenoid mounting plate 56. The plates 56 and 58 are secured to each other and to the housing 24 by way of mechanical fasteners such as a nut 74 and an associated bolt 76. The plates 56 and 58 are provided with aligned bores 78 and 80, respectively, which receive the bolts 76. Each plunger 52 is axially aligned with the corresponding plunger-receiving aperture 66.

The solenoid retainer plate 60 is mounted above the solenoid cluster 48 on a plurality of standoffs 82. As shown, the standoffs may be integral extensions of the bolts 76 that secure the solenoid plates 56 and 58 to the housing 24. The standoffs 82 are threaded at their upper ends 84, each standoff receiving a pair of nuts or other mechanical fasteners 86 and 88, which clampingly secure the solenoid retainer plate 60 therebetween. The solenoid retainer plate 60 is adapted to retain the plungers 52 of the solenoids 46 when the instrument 10 is an unpowered condition, as explained below.

Also mounted within the interior of the housing 24 is a circuit board 90 which carries a portion of the electrical circuitry that controls the operation of the instrument 10. More specifically, the circuit board 90 carries the drive transistors 92 that power the solenoids 46 and may be secured to the housing 24 in any suitable fashion. A heat sink plate 94 may be mounted adjacent the board 90 to carry away heat generated during the firing sequence as hereinafter described.

The firing box 14 further comprises a marking cartridge magazine 94 that is mounted to that portion of the second solenoid mounting plate 58 disposed over the opening 38 in the bottom wall 34 of the housing 24. The magazine 94 comprises a plate 96 having formed therein a plurality of apertures 98 arrayed in a configuration identical to that described above in connection with the first and second mounting plates 56 and 58 and shown in FIG. 3. Each aperture has an annular shoulder 100 at the upper surface 102 of the plate. Being in the same array as the solenoid cluster 48, each aperture 98 in the magazine 94 is in registry with a corresponding solenoid 46.

The apertures 98 are adapted to receive marking cartridges 104, each of which is provided with a conventional annular flange adapted to be seated on a respective one of the annular shoulders 100. Each cartridge 104 is a conventional 0.25 caliber marker load comprising a suitable charge and a marking dye. The cartridges are commercially available from any of a number of common manufacturers of ammunition. Preferably, the marking dye is of uniform color throughout the cartridges, but multiple colors may alternatively be provided.

The magazine is secured to the second solenoid mounting plate 58 by latching knobs 106 which are journaled through the plate 96 at opposite corners thereof and are adapted to be threaded into tapped holes 108 in the second plate 58. Guide pins 110 are provided at the other corners of the plate 96 and are received in holes 112 in the second solenoid mounting plate 58 to ensure proper registry of the cartridges 104 with the solenoid plungers 52.

The firing box 14 further includes connection means 114 to deliver power to the instrument 10. The power connection means comprises a conduit 116 carrying a pair of cables (not independently shown) which are adapted to be connected to, respectively, the positive and negative terminals of the vehicle battery. Thus, it will be understood that the instrument 10 derives the power necessary for its operation from the motor vehicle 12. It will be readily understood, however, that any source of power is adequate to operate the instrument as long as the electric potential or voltage is sufficient and constant in order to deliver enough power to energize the circuitry hereinafter described.

The remote-control box 16 contains the bulk of the electronic circuitry to operate the instrument 10 and comprises an initialization switch 120, a start-switch 122, and a pair of digital readouts reflecting a ten-second counter display 124, and a solenoid counter display 126. The control box 16 is electrically connected by means of a cable 128 to a brake sensor (not shown). The brake sensor is arranged to generate a signal to the control box 16 when the brake pedal is depressed to operate the braking system of the vehicle. The control box 16 may optionally provide a test switch 130, by which the entire sequence hereinafter described can be tested for accuracy without firing the markers from the firing box 14.

Figure 8:
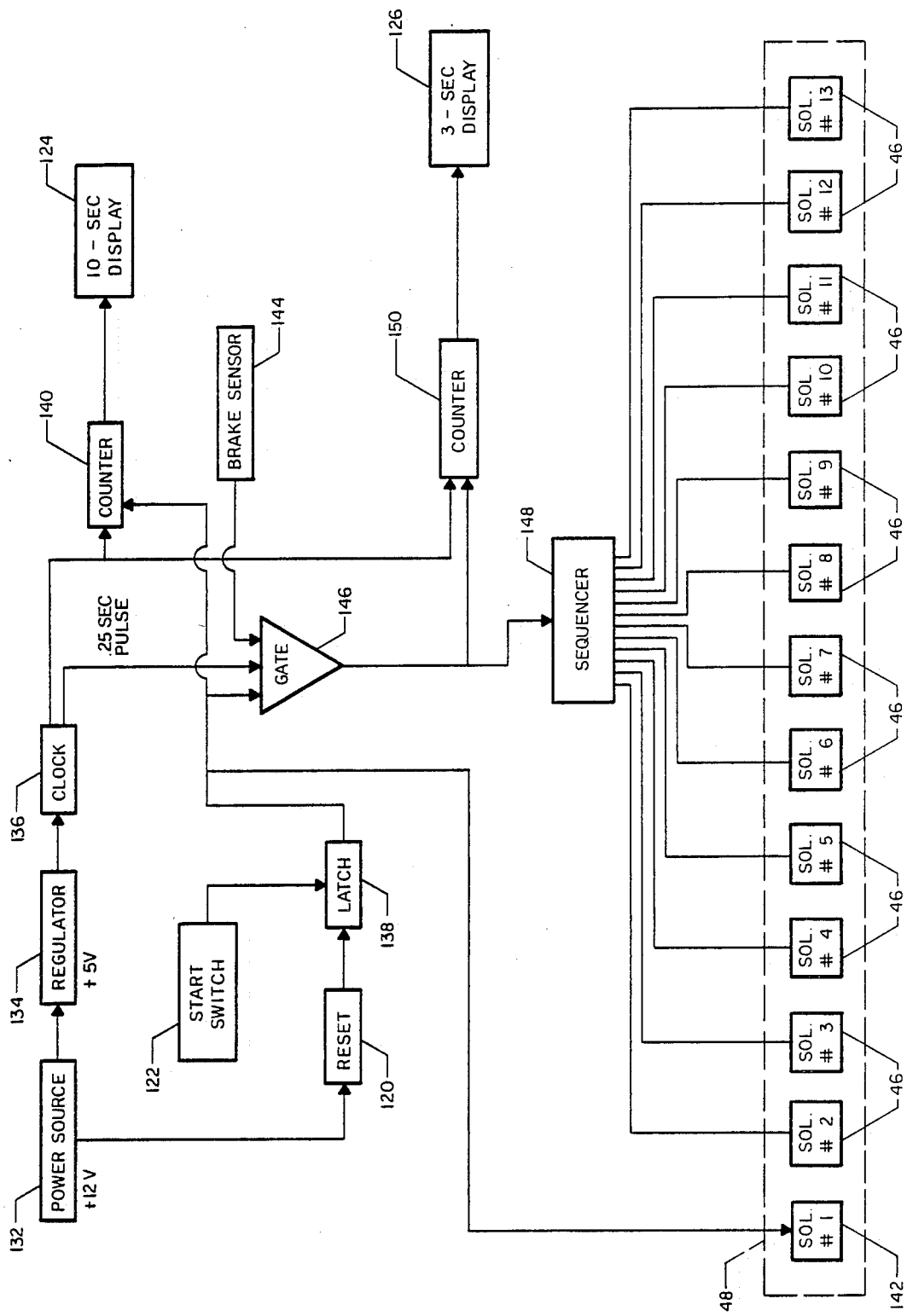
FIG. 8 is a block diagram of the electrical circuitry to operate the time and distance measurement apparatus according to the invention.

A block diagram illustrating the electrical circuitry installed within the control box is represented in FIG. 8. It will be seen that power is introduced to the system from a power source 132. Preferably, the power source is the battery of the vehicle which introduces the current through conduit 116 (see FIG. 1) and thence through conduit 20 to the control box 16. The voltage is reduced by regulator 134 to approximately five volts whereupon it powers an oscillator rated at 100,000 hertz which functions as a clock 136. Depressing the start-switch 122 generates a signal through a latching circuit 138 which may comprise any conventional configuration such as an XTAL gate with a pulsing light-emitting diode or LED. The latching circuit 138 disables the start-switch 122 and permits the timing and firing sequence hereinafter described to proceed without interruption. Depressing the initialization switch 120 resets the system to its power-up configuration and enables the start-switch 122.

Depressing the start-switch 122 not only engages the latching circuit 138, but signals a seconds counter 140 to initiate a ten-second count based on the time signal from the clock 136. The seconds counter 140 displays the count as it proceeds in the ten-second counter display 124 on the front face of the control box 16. The start-switch also initiates the firing of a reference marker from solenoid No. One, shown at 142. During the ten-second count, the system awaits a signal from a brake sensor 144. Simultaneously, the clock 136 pulses a signal to a gate 146 every 0.25 seconds. When the gate 146 receives the signal from the brake sensor 144, a pulsed signal every 0.25 seconds is sent to a sequencer 148 which initiates the firing of solenoids Nos. Two through Thirteen in the solenoid cluster 48 consecutively every 0.25 seconds. Each solenoid 46, when activated, responds to the signal by causing the plunger 52 therein to reciprocate downwardly through its corresponding through-hole 68 in the first solenoid mounting plate 56, and through the plunger-receiving aperture 66 in the second solenoid mounting plate 58 to contact the charged cartridge 104 in the magazine 94. The cartridge 104 is thus discharged causing a dye to be propelled downwardly to impact the surface of the ground over which the vehicle is traveling. It will be readily apparent that a dye marker is propelled to the ground surface at intervals of 0.25 seconds during the sequence of firing.

When the gate 146 receives a signal from the brake sensor 144, another signal is simultaneously generated to a solenoid counter 150 and to the seconds counter 140. The latter signal stops the running of the seconds counter 140, and initiates a running count in the solenoid counter 150 which is displayed in the solenoid counter display 126 on the face of the control box 16. The solenoid counter proceeds with a consecutive count based on the time signal from the clock 136 until the last solenoid 46 is fired, at which time a stop signal is generated to the solenoid counter 150 to halt the count. The solenoid counter 150 functions as a verification, in that if the system has operated correctly, the correct count displayed on the solenoid counter display 126 should be three seconds, there being twelve solenoids fired every 0.25 seconds after the signal from the brake sensor 144 is received.

Figure 7:
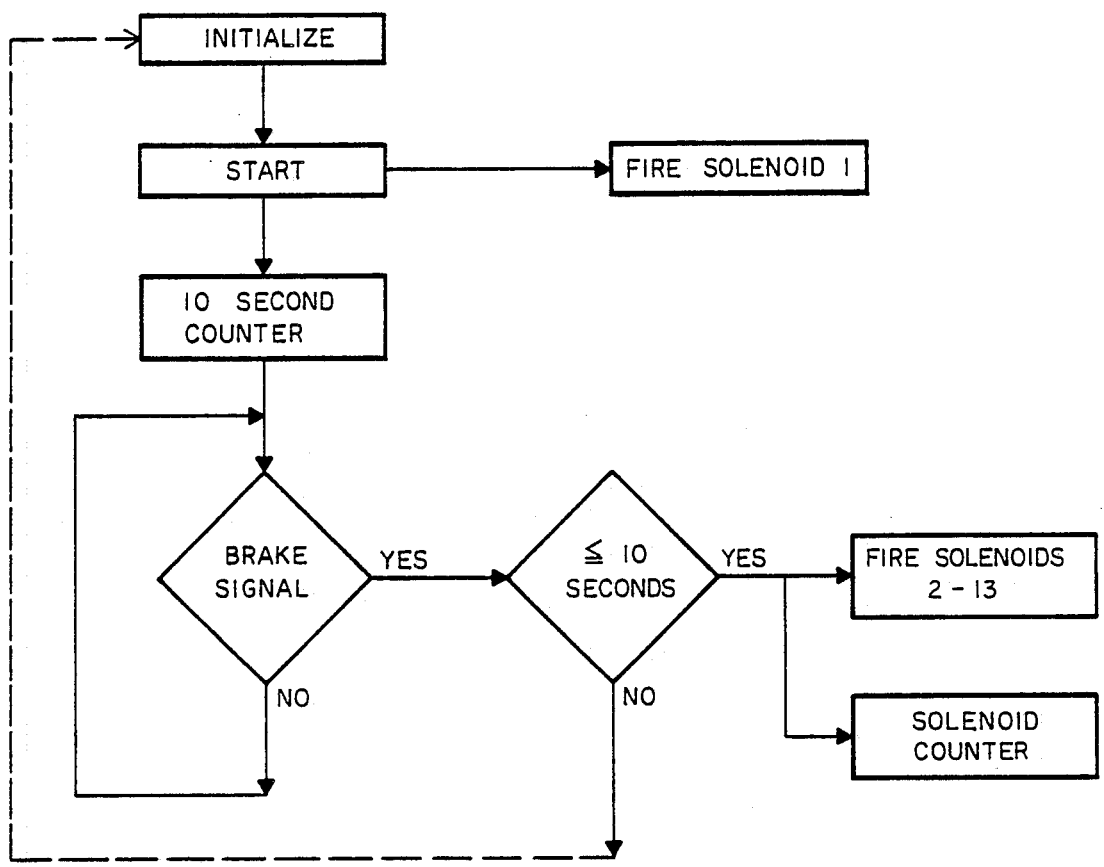
FIG. 7 is a diagram illustrating the sequence of events in operation of the time-and-distance measurement apparatus of FIG. 1.

The sequence of operations is shown in FIG. 7. It will be apparent that after initialization, the start-switch fires solenoid No. One which places a reference marker on the ground surface. This is preferably done when the vehicle has attained a reference velocity and the deceleration is to proceed shortly thereafter. The ten-second counter is initiated during which the brake must be engaged in order for the test to proceed. If the brake signal is not received within ten seconds, the firing sequence does not proceed and the system must be initialized in order to commence another sequence. If the brake signal is received within ten seconds, the remaining twelve solenoids fire corresponding cartridges every 0.25 seconds, sequentially, over three seconds while the solenoid counter verifies the three-second second count. Each firing leaves a visible marker on the ground surface over which the vehicle has moved during the firing sequence.

Figure 6:
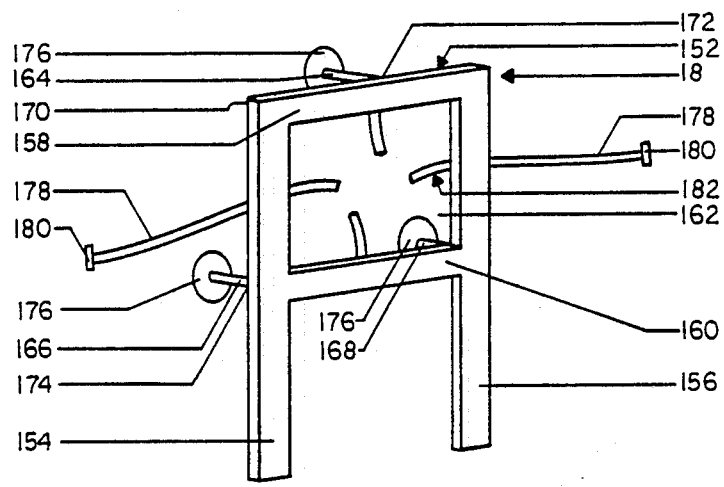
FIG. 6 is a perspective view of means for mounting the firing box to the vehicle of FIG. 1.

It will be apparent that the firing box 14 must be mounted to the vehicle 12 so that the cartridges 104 will be projected downwardly toward the ground surface. To this end, the mounting bracket 18 is provided, and as best shown in FIG. 6, it comprises a substantially U-shaped member 152 having a pair of legs 154, 156 which extend in parallel spaced relation from opposite ends of a web 158 of the U-shaped member 152. A cross brace 160 further interconnects and supports the legs 154, 156 and, in cooperation with the web 158, defines an instrument-receiving aperture 162 which has a height and a width substantially equal to the height and width of the firing box 14. The bracket 18 further includes mounting arms 164, 166, 168 which extend outwardly from a rear surface 170 of the U-shaped member 152. The arm 164 is secured to a rear surface of the web 158 at a point 172 [not visible] intermediate the opposite end portions thereof. The arms 166 and 168 extend from, respectively, the legs 154 and 156 at points 174 [not visible]-which are at locations substantially opposite to the points at which the cross brace 160 is secured to the legs. Rubber pads or other mechanical protective devices 176 are secured to the distal ends of the mounting arms 164, 166, 168 and provide protection for the finish of the vehicle at the points of contact with the motor vehicle 12 as explained hereinbelow. Adjustable straps 178 are attached to the mounting bracket and are adapted to secure the bracket to the vehicle by means of conventional tension brackets or hooks 180 at the ends of the straps 178.

In assembly, the bracket 18 is mounted to the vehicle 12 by mechanically holding the rubber pads 176 securely against the vehicle door 19 and hooking the brackets 180 on a suitable connection point on the vehicle 12 such as the rain well, door edge, etc. The bracket 18 may be secured to any convenient mounting surface on the vehicle 12 and is not restricted to attachment to the door 19, although this will often provide the most convenient mounting surface. The firing box 14 is received by the instrument-receiving aperture 162 and is secured to the bracket 18 by way of a mounting means 182. The mounting means 182 may be any conventional fastening structure, comprising, for example, clamps, hooks, or straps. It is preferable that the firing box 1,4 be mounted so that the longitudinal axis (not shown separately in the drawings) of the solenoid cluster 48 be oriented substantially normal to the ground (shown in FIG. 1). To facilitate so positioning the firing box 14, the rubber pads 176 may be secured to the mounting arms 164, 166, 168 by way of an articulated joint (not shown separately in the drawings) that allows for fine positioning of the bracket 18. Further, the mounting arms 164, 166, 168 may be axially adjustable to provide further adjustment of the firing box position relative to the ground. Further securement as needed may minimize undesirable vibration when the vehicle is under way. Preferably, the magazine 94 will be approximately twelve to eighteen inches from the surface of the ground when the firing box 14 is correctly mounted to the vehicle 12 by means of the mounting bracket 18.

It will be understood that the bracket 18 and the motor vehicle 12 form no part of the invention in its broader aspects and are shown merely for the purpose of illustrating a typical environment in which the apparatus 10 can find use.

Reasonable variation and modification are possible within the scope of the foregoing disclosure and drawings without departing from the scope of the invention.

The embodiments of the invention in which an exclusive property or privilege is claimed are defined as follows:

1. An apparatus for marking a surface in a manner to indicate changes in velocity of a vehicle moving over the surface, said apparatus comprising:
   a plurality of markers;
   means for supporting said plurality of markers on the vehicle;
   firing means for propelling the markers from the supporting means with a predetermined force; and
   timing means for actuating the firing means whereby the markers are sequentially propelled from the supporting means in equally spaced time increments.

2. An apparatus according to claim 1, wherein the timing means is adapted to actuate the firing means in response to a signal indicating a change in velocity of the vehicle.

3. An apparatus according to claim 2, including a sensor adapted to detect a change in velocity of the vehicle and to actuate the timing means to generate said signal in response to said change.

4. An apparatus according to claim 3, wherein the sensor is a brake sensor adapted to detect said change in response to actuation of the vehicle brake.

5. An apparatus according to claim 3, wherein the sensor is a momentum sensor responsive to acceleration of the vehicle.

6. An apparatus according to claim 1, wherein the firing means comprises a plurality of solenoids, each of the solenoids corresponding to a respective single one of the markers, and disposed in juxtaposition thereto.

7. An apparatus according to claim 1, wherein each of the markers comprises a cartridge including an explosive charge and a dye compound.

8. An apparatus according to claim 7, wherein the cartridges are disposed in a magazine which is removably secured to the support means.

9. An apparatus according to claim 8, wherein the support means comprises a housing and the firing means is mounted within the housing.

10. An apparatus according to claim 1, wherein the firing means is mounted to the support means.

11. An apparatus according to claim 1, including control means for actuating the timing means.

12. An apparatus according to claim 11, wherein the control means comprises a start-switch adapted to actuate the firing means to project a single one of the markers prior to actuation of the timing means.

13. An apparatus according to claim 12, wherein the control means includes a sensor adapted to actuate the timing means in response to a change in velocity of the vehicle.

14. An apparatus according to claim 13, wherein the sensor is responsive to actuation of the vehicle brake.

15. An apparatus according to claim 13, wherein the sensor is a momentum sensor responsive to acceleration of the vehicle.

16. An apparatus according to claim 11, wherein the control means is remote from the firing means.

17. An apparatus according to claim 11, wherein the timing means is adapted to actuate the firing means every 0.25 seconds until all the markers have been projected.

18. An apparatus according to claim 11, wherein each marker is a different color.

19. An apparatus according to claim 1, wherein the timing means is adapted to actuate the firing means every 0.25 seconds until all the markers have been projected.

20. An apparatus according to claim 1, wherein each of the markers is a different color.

* * * * *